H. J. STEFFENSEN.
BALL BEARING WORM GEAR.
APPLICATION FILED JULY 24, 1918.
1,307,462.
Patented June 24, 1919.
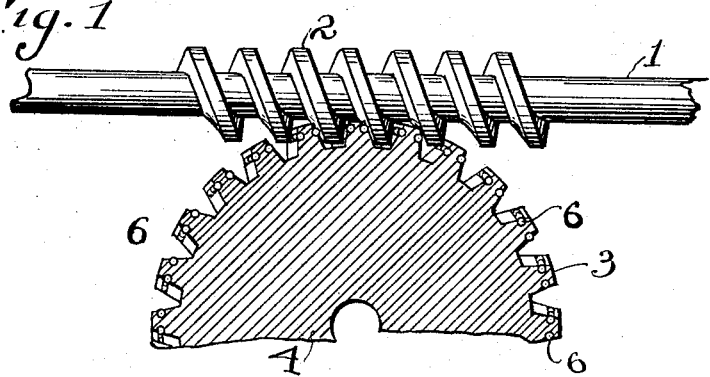
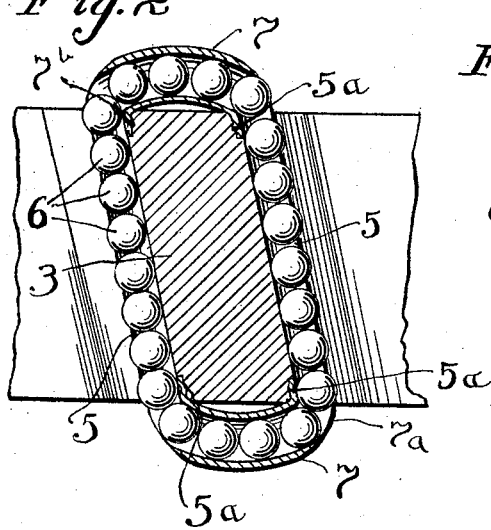
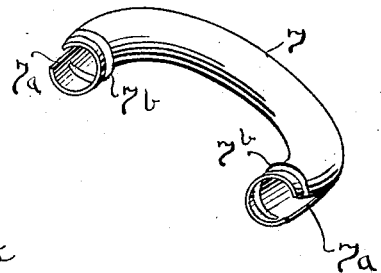
INVENTOR
H. J. STEFFENSEN.
BY H. S. Hill
ATTORNEY

UNITED STATES PATENT OFFICE.

HERBERT J. STEFFENSEN, OF POY SIPPI, WISCONSIN.

BALL-BEARING WORM-GEAR.

1,307,462.  Specification of Letters Patent. Patented June 24, 1919.

Application filed July 24, 1918. Serial No. 246,597.

*To all whom it may concern:*

Be it known that I, HERBERT J. STEFFENSEN, a citizen of the United States, residing at Poy Sippi, in the county of Waushara, State of Wisconsin, have invented a new and useful Ball-Bearing Worm-Gear; and I do hereby declare the following to be a full, clear, and exact description of the invention, such as will enable others skilled in the art to which it appertains to make and use the same.

The present invention relates to certain new and useful improvements in worm gearing, and has for its object to provide a worm gear which embodies novel features of construction whereby those portions of the teeth which engage the helical rib of the worm are provided with anti-friction bearings, thereby reducing the friction and loss of energy to a minimum.

Further objects of the invention are to provide a ball bearing worm gear which is simple and inexpensive in its construction, which provides a continuous raceway around each of the teeth for the proper movement of the antifriction balls, and which provides for easy and quick access to the raceways for the purpose of adjusting or replacing the balls.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of a ball bearing worm gearing constructed in accordance with the invention, portions being broken away and shown in section.

Fig. 2 is an enlarged sectional view through one of the teeth of the worm gear, showing the train of anti-friction balls in position within the raceways.

Fig. 3 is a detail view of one of the U-shaped end members.

Corresponding and like parts are referred to in the following description and indicated in all the views of the drawings by the same reference characters.

Referring to the drawings, which illustrate one embodiment of the invention, the numeral 1 designates a worm shaft which is provided with the usual helical rib or worm 2, said worm engaging the transversely inclined teeth 3 of the worm gear 4. Each of the teeth 3 is provided upon opposite sides thereof with an undercut raceway 5 within which anti-friction balls 6 are loosely mounted. These balls are free to travel longitudinally in the raceways 5 and project outwardly beyond the sides of the teeth so as to engage the worm 2, although they are held against displacement by the undercut sides of the raceways. At each end of the tooth the corresponding raceways 5 are connected by a U-shaped tube 7, the raceways and tubes providing a continuous passage for the travel of the balls when the device is in operation. The ends of the raceways 5 which extend through the side of the gear wheel are enlarged to receive the arms of the U-shaped tube 7 so that the bore of these arms registers with the raceways. The outer sides of the arms of the U-shaped tubes are cut away at 7ª so that the sides of the connecting tubes are flush with the sides of the teeth, thereby providing smooth side walls and avoiding any corners or projections which might catch upon the worm. These connecting tubes 7 have a detachable and interlocking engagement with the ends of the teeth 3 so that they can be readily removed at any time to obtain access to the raceways when it is desirable or necessary to adjust or replace the anti-friction balls. For this purpose the ends of the connecting tubes are shown as having ribs 7ᵇ pressed outwardly therefrom, said ribs being adapted to spring into and interlock with corresponding grooves 5ª in the enlarged ends of the raceways 5. The connecting tubes are formed of spring material, and owing to the fact that the free ends thereof are cut away or slit on the outer sides thereof, at 7ª, it will be obvious that there will be no difficulty in springing the ends of the tubes into and out of engagement with the enlarged ends of the raceways, although after the tubes have once been fitted in position they will be held securely against accidental displacement. The projecting portions of the anti-friction balls 6 on one side of the teeth will operatively engage the worm 2 as the latter is rotated, thereby reducing the friction and loss of energy in transmitting the power through the gearing to a minimum.

Having thus described the invention, what I claim as new and desire to secure by Letters Patent, is:—

1. A ball bearing worm gear formed with teeth having corresponding raceways in opposite sides thereof, U-shaped tubes spanning the ends of the teeth and connecting the ends of the raceways, said tubes having a detachable and interlocking connection with the gear, and anti-friction balls arranged to travel in the continuous passage provided by the raceways and tubes.

2. A ball bearing worm gear formed with teeth having corresponding raceways in opposite sides thereof, U-shaped tubes spanning the ends of the teeth and having the arms thereof fitted in the ends of the raceways to connect the same, the outer sides of the arms being cut away flush with the sides of the teeth, and anti-friction balls arranged to travel in the continuous passageway provided by the raceways and tubes.

3. A ball bearing worm gear formed with teeth having corresponding raceways in opposite sides thereof, the ends of the raceways opening through the sides of the gear where they are provided with enlarged seats and depressions, and U-shaped tubes spanning the ends of the teeth and having the arms thereof fitted in the enlarged seats of the raceways, said arms being formed with ribs which interlock with the depressions to hold the tubes in position, and anti-friction balls arranged to travel around the continuous passage provided by the raceways and tubes.

4. A ball bearing worm gear formed with teeth having corresponding raceways in opposite sides thereof, the ends of the raceways opening through the sides of the gear where they are enlarged and provided with transverse depressions, U-shaped tubes spanning the ends of the teeth and connecting the raceways, the arms of the tubes being fitted in the enlarged ends of the raceways and having the outer sides thereof cut away flush with the sides of the teeth, exterior ribs being provided upon the said arms for springing into and interlocking with the depressions of the raceways, and anti-friction balls arranged to travel around the continuous passage provided by the raceways and U-shaped tubes.

In testimony whereof I have signed my name to this specification in the presence of two subscribing witnesses.

HERBERT J. STEFFENSEN.

Witnesses:
CHESTER W. COLT,
JAMES PETERSEN.